(12) United States Patent
Marquez

(10) Patent No.: US 7,390,044 B2
(45) Date of Patent: Jun. 24, 2008

(54) TRUCK BED RAIL WITH INTERNAL LIGHT SOURCE AND LIGHT TRANSMITTING APERTURES

(76) Inventor: Juan Marquez, 12423 South St., Cerritos, CA (US) 90703

( * ) Notice: Subject to any disclaimer, the term of this patent is extended or adjusted under 35 U.S.C. 154(b) by 76 days.

(21) Appl. No.: 11/264,284

(22) Filed: Oct. 31, 2005

(65) Prior Publication Data

US 2006/0114684 A1 Jun. 1, 2006

Related U.S. Application Data

(60) Provisional application No. 60/623,650, filed on Oct. 30, 2004.

(51) Int. Cl.
*B60P 3/00* (2006.01)
(52) U.S. Cl. .......................... 296/3; 362/544
(58) Field of Classification Search ................ 362/487, 362/485, 544; 296/3, 36, 32, 40; 248/499, 248/503; 410/101–106; D12/406, 412, 414, D12/414.1; D25/38, 43; D26/25, 28, 35, D26/97, 120
See application file for complete search history.

(56) References Cited

U.S. PATENT DOCUMENTS

| 4,818,006 | A | * | 4/1989 | Arndt ......................... 296/32 |
| 5,495,400 | A | * | 2/1996 | Currie ....................... 362/485 |
| 6,763,778 | B2 | * | 7/2004 | Bergquist et al. ........... 362/485 |
| 2005/0152145 | A1 | * | 7/2005 | Currie et al. ................ 362/294 |
| 2007/0089338 | A1 | * | 4/2007 | Barnhouse et al. ........... 40/604 |

* cited by examiner

*Primary Examiner*—Lori L Lyjak
(74) *Attorney, Agent, or Firm*—Myers Dawes Andras & Sherman LLP; Joseph C. Andras

(57) ABSTRACT

Disclosed is a lighted truck bed rail for use with a truck. The lighted truck bed rails is formed from a tubular member made from a straight central member having end ports and a pair of curved end members that may be connected to the end ports of the straight central member. As a result, a rigid light source such as a neon bulb assembly may be inserted into and secured within the straight central member via one of the end ports. A plurality of light transmitting apertures are provided in the side wall of the straight central member so that the lighted truck bed rail enhances the appearance of the associated truck.

24 Claims, 6 Drawing Sheets

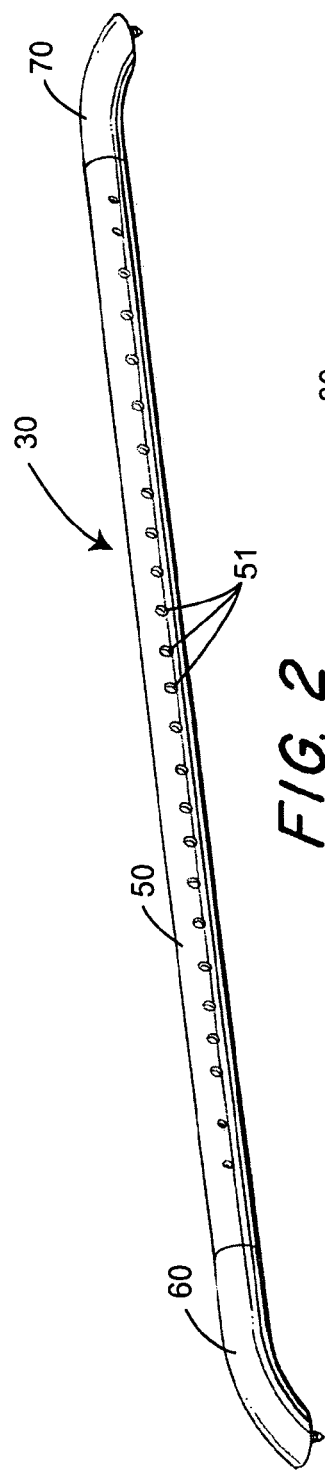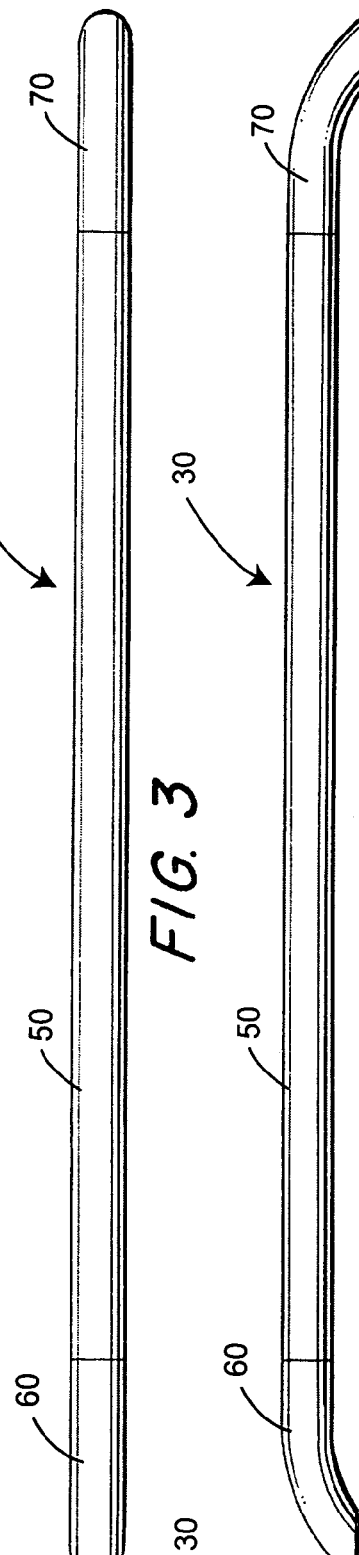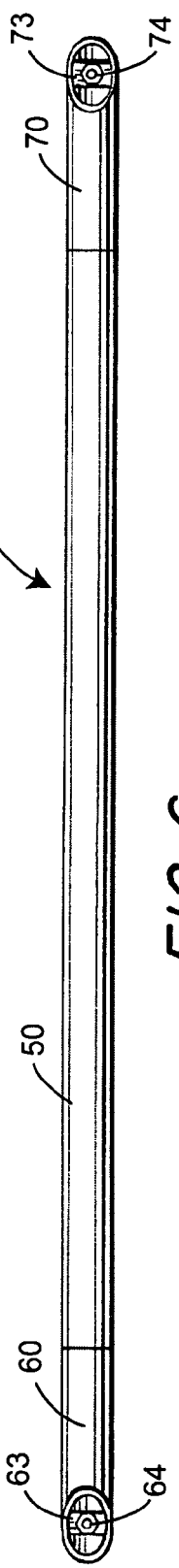

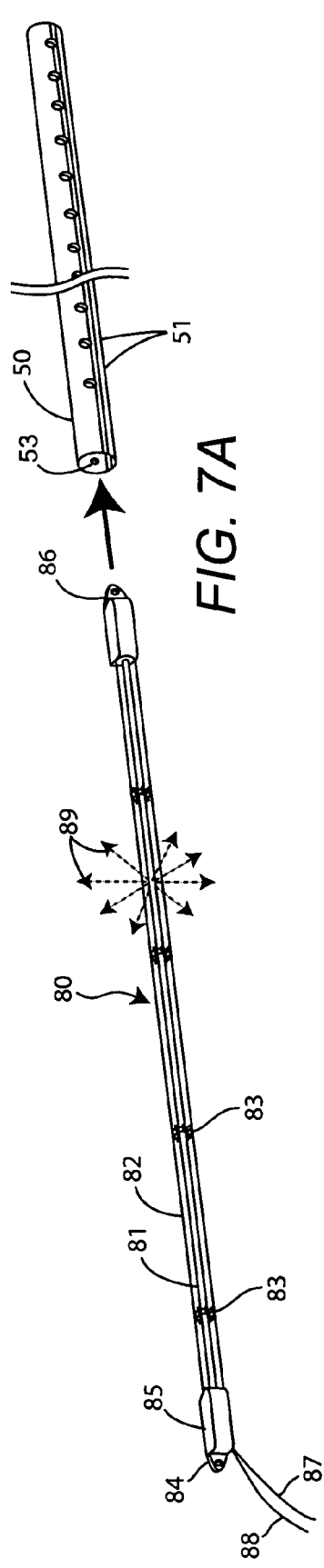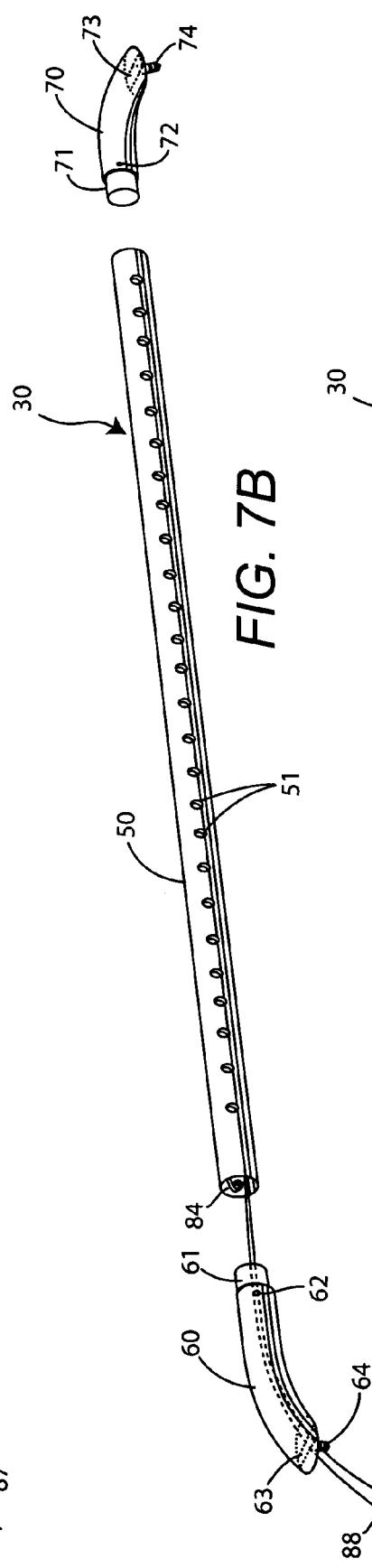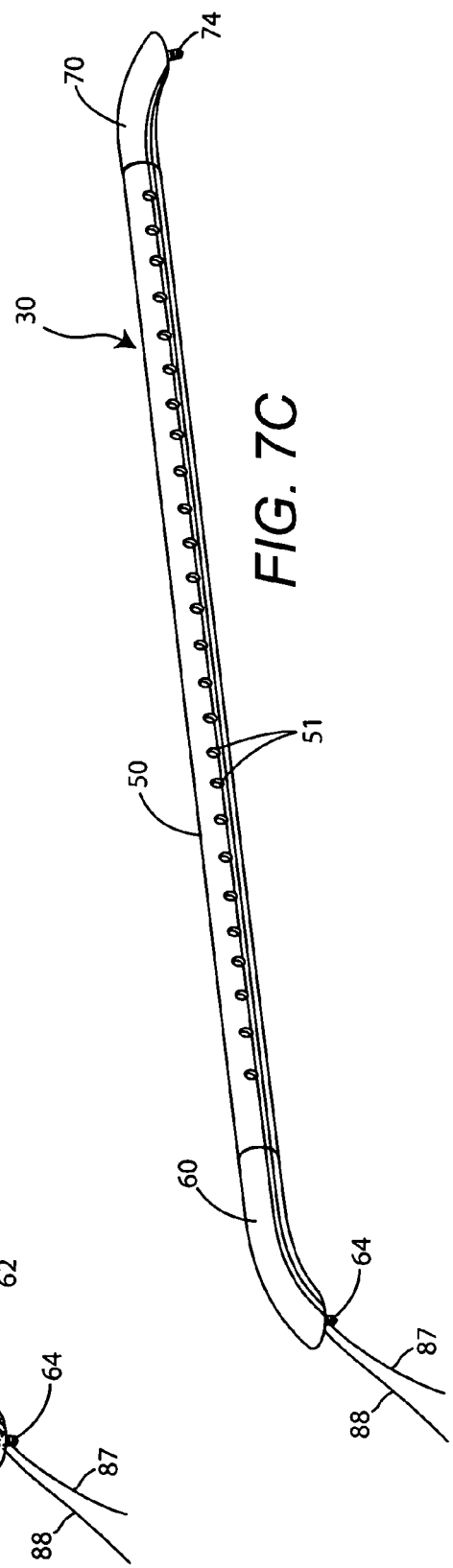

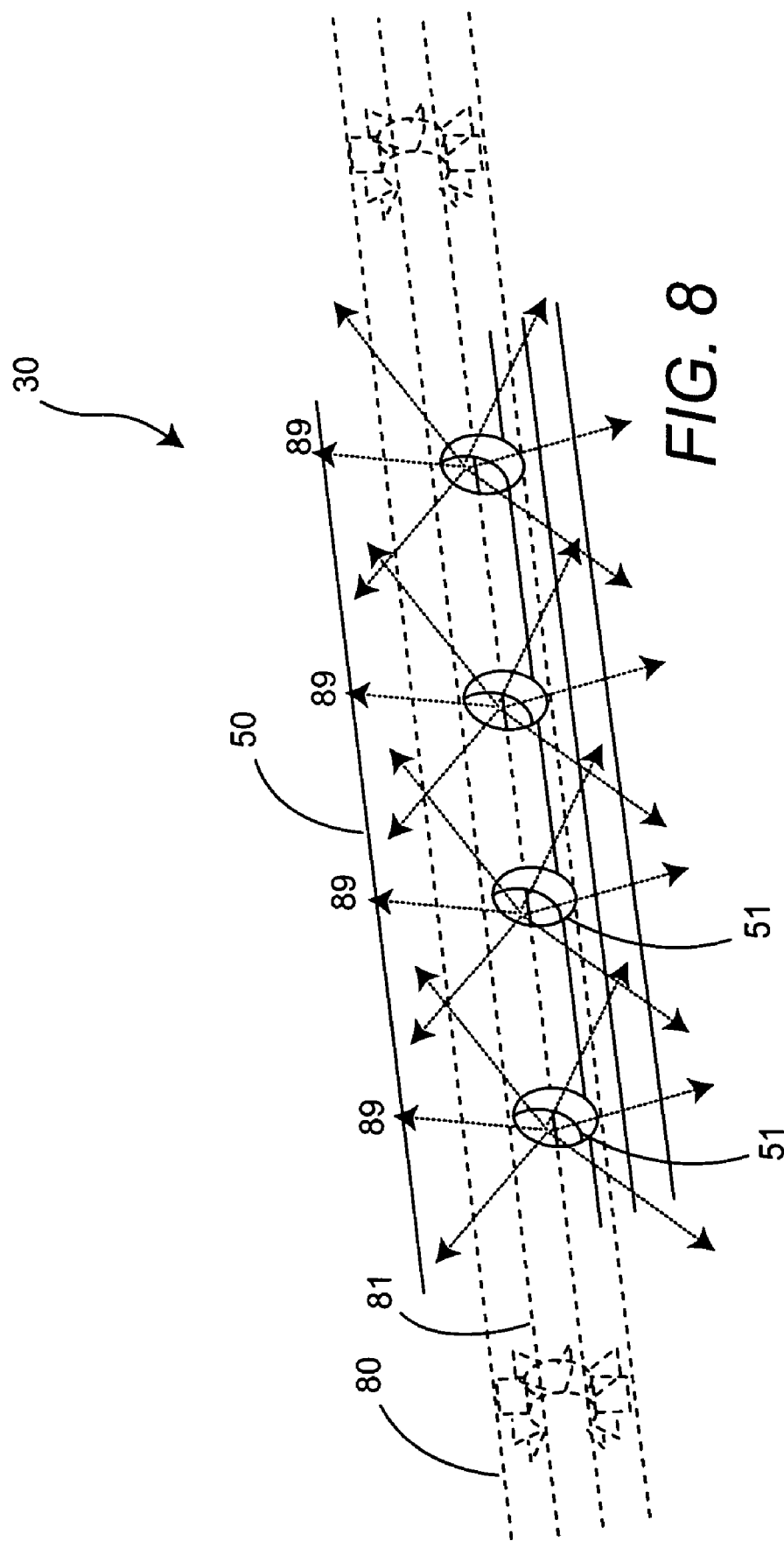

TRUCK BED RAIL WITH INTERNAL LIGHT SOURCE AND LIGHT TRANSMITTING APERTURES

This application claims the benefit of provisional patent application No. 60/623650 filed on Oct. 30, 2004.

FIELD OF THE INVENTION

The present invention relates generally to automotive accessories and, more particular, to a truck bed rail with an internal light source and light transmitting apertures.

BACKGROUND OF THE RELATED ART

If not already outfitted as desired, many automobile owners elect to add various accessories to their vehicle that enhance the vehicle's function or performance, enhance the vehicle's appearance, or both. Truck owners are no exception.

A common truck accessory is a so-called "bed rail", an accessory that is often formed of tubular steel, or the like, and bolted to the upper surfaces on either side of the truck's bed. Generally speaking, the prior art bed rails have been formed from single, solid walled tube that is bolted to the truck bed with a suitable flange. The general goal is structural integrity since fairly heavy loads may be applied to the bed rails.

FIG. 1A, for example, illustrates a pair of prior art bed rails 10 that are bolted to the upper surfaces of the left and right walls of a truck bed. As shown, the known bed rail generally comprises a center section 11, a first curved end portion 12 and a second curved end portion 13. In the known bed rails, the center section 11 and first and second end portions 12, 13 are integral, generally formed from a single piece of tubular metal. No internal light is provided.

There remains a need, therefore, for a truck bed rail that is structurally sound and that includes an internal light source for an enhanced appearance.

SUMMARY OF THE INVENTION

In a first aspect, the invention resides in a lighted truck bed rail for use with a truck comprising a tubular member having a wall and first and second ends; means for fastening the first and second ends of the tubular member to the bed of a truck; a light source mounted inside the tubular member, the light source emanating light rays therefrom; and a plurality of light transmitting apertures located in the wall of the tubular member, the light rays from the light source passing through the light transmitting apertures.

In a more particular aspect, the invention resides in a lighted truck bed rail for use with a truck comprising a tubular member formed from a main member having an end port and at least one curved end member; means for attaching one end of the at least one curved end member to the end port of the main member; means for fastening the tubular member to the bed of a truck; a light source mounted inside the main member via the end port, the light source emanating light rays therefrom; and a plurality of light transmitting apertures located in the wall of the main member, the light rays from the light source passing through the light transmitting apertures.

In another more particular aspect, the invention resides in a lighted truck bed rail for use with a truck comprising: a tubular member formed from a central member that has two end ports and is substantially straight and from first and second curved end members; means for attaching one end of each of the first and second curved end members to a corresponding end port of the central member; means for fastening another end of the first and second curved end members to the bed of a truck; a rigid light source mounted inside the central member via one of the end ports, the light source emanating light rays therefrom; and a plurality of light transmitting apertures located in the wall of the central member, the light rays from the light source passing through the light transmitting apertures.

BRIEF DESCRIPTION OF THE DRAWINGS

The just summarized invention can be best understood with reference to the following description taken in view of the drawings of which:

FIGS. 1B and 2-12, individually described with more particularity below, illustrate a preferred embodiment of a truck bed rail 30 according to the present invention;

FIG. 1B is an outer side view of the preferred truck bed rail 30 formed from a central member 50 and a pair of first and second curved end portions 60, 70, the truck bed rail 30 mounted to the bed 101 of a truck 100 (generally shown in dashed lines) with a plurality of light transmitting apertures 51 facing outward therefrom;

FIG. 2 is a is a perspective view of the preferred truck bed rail 30 and its plurality of outwardly-facing light-transmitting apertures 51;

FIG. 3 is a top view of the preferred truck bed rail 30;

FIG. 4 is a head-on or end view of the preferred truck bed rail 30, the other end view being a mirror image thereof;

FIG. 5 is an inner side view of the preferred truck bed rail 30;

FIG. 6 is a bottom plan view of the preferred truck bed rail 30;

FIG. 7A shows a long rigid light assembly 80 (e.g. a neon bulb and associated transformer) being slid into a center section 50;

FIG. 7B shows first and curved end members 60, 70 being connected to the center section 50 after the light source 80 has been installed therein;

FIG. 7C shows the fully assembled bed rail 30 with the wires 87, 88 from the internal light source 80 extending from one end thereof;

FIG. 8 is a close-up view of the light rays 89 that come from the neon bulb 81 of the light source 80 contained within the central member 50 emanating through the apertures 51;

FIG. 9 is a schematic view of the first preferred aperture 51 that is provided as a circle;

FIG. 10 is a schematic view of an alternative aperture 51a that is provided as an oval;

FIG. 11 is a schematic view of an alternative aperture 51b that is provided as a square;

FIG. 12 is a schematic view of an alternative aperture 51c that is provided as a rectangle;

DETAILED DESCRIPTION OF THE PREFERRED EMBODIMENTS

FIGS. 1B and 2-6, 7A, 7B, 7C, and 8 illustrate a truck bed rail 30 according to a preferred embodiment of the present invention.

Figure 1A:
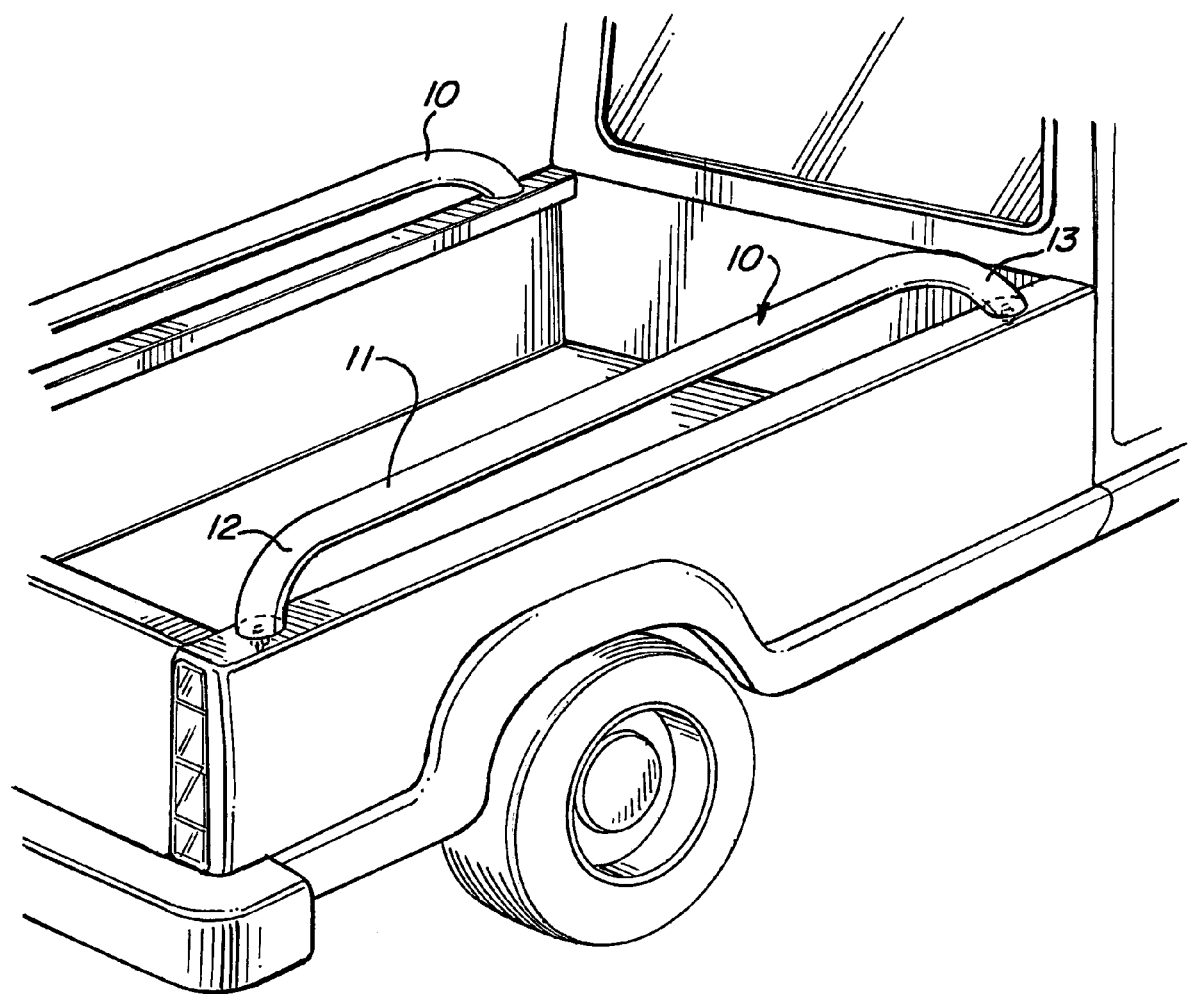
FIG. 1A shows a pair of prior art truck bed rails 10 that are bolted to the upper surfaces of the left and right walls of a truck bed.
Figure 1B:
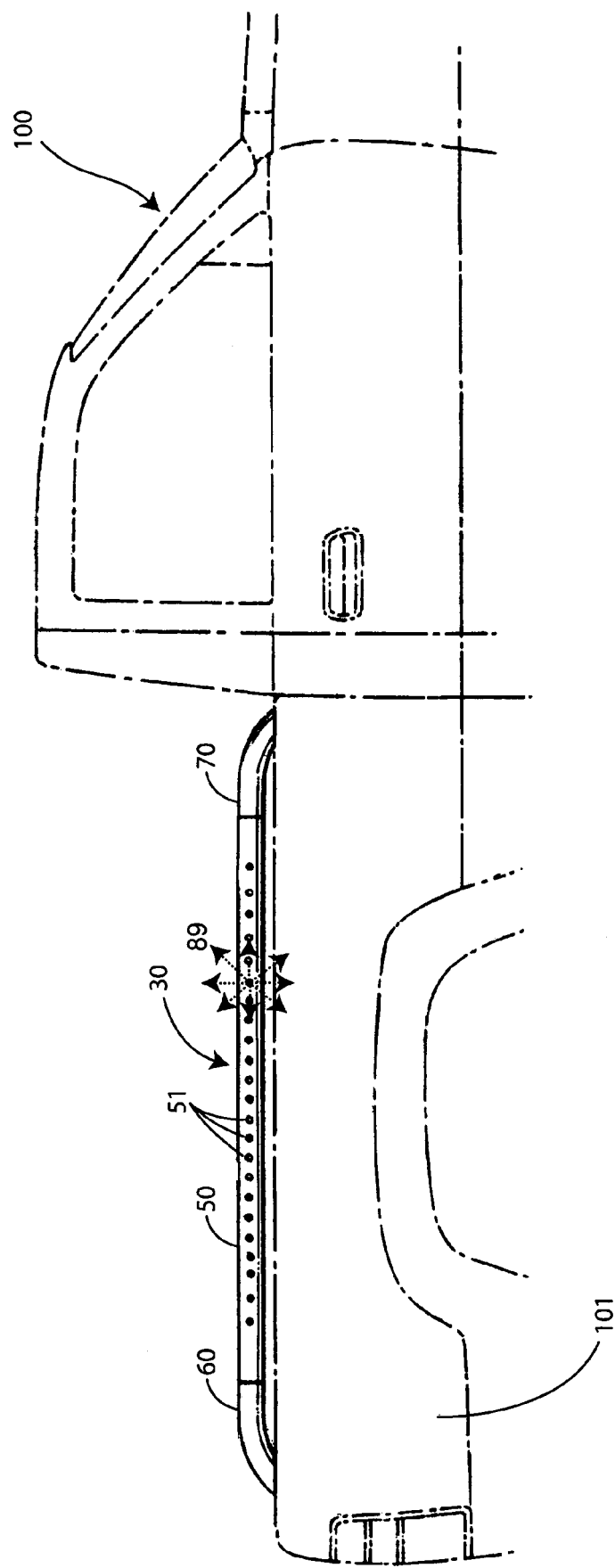

FIG. 1B shows a truck bed rail 30 mounted to a truck 100 and, more particularly, mounted to an upper surface of the right side wall of the truck's bed 101. Although it is not visible in this view, there is, of course, another truck bed rail mounted to the upper surface of the left side wall. The truck bed rail 30 uniquely has a plurality of apertures 51 formed in a wall thereof, and an internal light source (describe below) that is connected to the truck's electrical system, such that when the truck's running lights are on, the light source transmits light rays through the bed rail's apertures 51 as suggested by dashed arrows 89. The result is a structurally sound bed rail 30 that improves the appearance of the truck 100, particularly at night.

The bed rail 30 could be formed from one integral tubular member (i.e. a bent tube), but then the internal light source (discussed below) would need to be flexible or would need to be inserted before the bends were made or via an access port in one of the bends. In either case, there would be some difficulty in securing the internal light source with the tube.

As shown in all of the figures, therefore, the preferred bed rail 30 is not formed from an integral member, but rather from a plurality of members (at least two) that slidably engage one another with suitable fittings. In particular, perhaps as best shown in FIGS. 7A, 7B, and 7C, a main member 50 is provided separately from and thereafter connected to at least one curved end portion. Preferably, the main member is provided a central member 50 that is sandwiched between a first curved end portion 60 and a second curve end portion 70. The curved end portions 60, 70 of the preferred embodiment are radiused, but the end portions could be more angular or formed with an even larger radius if desired.

As a result, as shown in FIG. 7A, a long rigid light assembly 80 that cannot be end around a curve (e.g. a neon bulb and associated transformer) may be initially slid into an end port (not separately numbered) of the center section 50, connected thereto via flanges 84, 86 and an aperture (not numbered) in the side wall of the central member 50, and then the center section 50 and the light source 80, in combination, may be connected to the first and second curved end portions 60, 70 that thereafter secure the overall bed rail 30 the truck 100.

In the preferred embodiment, the light source 80 is secured to the interior of the center member 50 with standard fasteners that go through suitable apertures 53 in the wall of the central member 50, and then thread into aligned apertures in the end flanges 84, 86 of the light assembly 80.

As shown through the figures, particularly FIGS. 1B, 7A, and 8, the light source 80 outputs light rays 89. A preferred light source 80 is a conventional neon bulb assembly having first and second end 84, 86. In such case, a neon bulb 81 is supported within a clear sleeve 82 and supported therein by annular support members 83. A transformer 85 for powering the neon bulb 81 may be integral with the light assembly 80 as shown, or the transformer may be mounted separately either inside or outside of the central member 50. A pair of wires 87, 88 draw power from the automobile's electrical system so that the transformer can power the neon bulb 81.

The assembly of the preferred bed rail 30 is best understood with references to FIGS. 7A, 7B, and 7C. FIG. 7A shows the light source 80 being inserted into the central member 50.

FIG. 7B shows the curved end portions 60, 70 being installed on the central member 50. As shown in FIG. 7B, the first and second curved end portions 60, 70 are provided with means for attachment to the central member 50. In the preferred embodiment, the means for attachment comprise slightly smaller diameter sleeves 61, 71 that are secured to the first and second curve end portions 62, 72 with fasteners, such as pop rivets. The sleeves 61, 71 of course, may be welded to the first and second curved end portion 60, 70, or secured thereto with any suitable means for securing. There is no need to use a fastener to secure the sleeves 61, 71 to the central member 50 because the central member is effectively captured in between the curved end members 60, 70 after they are connected to the truck bed 101.

As further shown in FIG. 7B, the wires 87, 88 leading to the light assembly 80 are fed through the interior of one of the curved end members 60, 70 (shown here as first curved end member 60) and then connected to the vehicle's electrical system after the overall bed rail 30 is mounted to the truck 100. The preferred bed rail 30 is mounted to the truck with threaded studs 64, 74 that extend downward from corresponding cross-members 73, 73 at the end of each curved end member 60. 70. The threaded studs 64, 74 are passed through apertures drilled in the truck bed 101 and secured thereto with corresponding nuts (not shown). The threaded studs 64, 74 are preferred because the means for fastening is not evident after installation, but any suitable means for fastening the bed rail 30 to the truck 100 may be used. For example, in lieu of threaded studs, flanges having a pattern of mounting holes could be welded to the end of the curved end members 60, 70 and then nuts and bolts may be used in a corresponding pattern.

As shown in the various figures, the central member 50 includes a plurality of apertures 51 that allow light rays 89 emanating from the light member 80 to escape from the interior of the central member 50. This creates a pleasing effect to a viewer of the automobile. The preferred apertures 51 are shown to be facing sideways so that the light coming through them shines outward. If desired, however, the apertures may be arranged to face upward, or downward, or inward, or some combination thereof.

Figure 9:
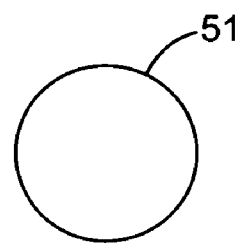
Figure 10:
Figure 11:
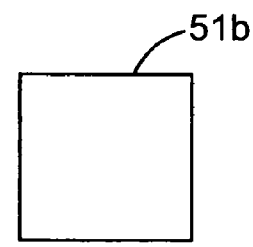
Figure 12:
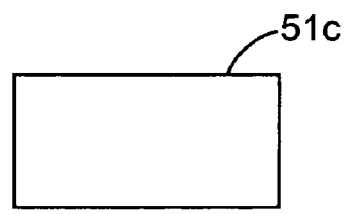
Figure 13:
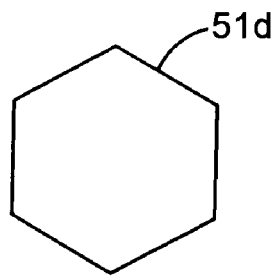
FIG. 13 is a schematic view of an alternative aperture 51d that is provided as a hexagon.
Figure 14:
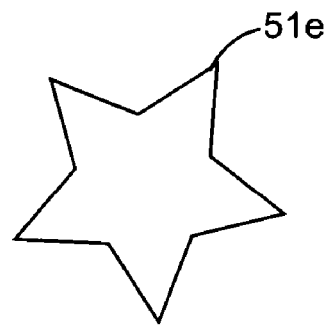
FIG. 14 is a schematic view of an alternative aperture 51e that is provided as a five-pointed star.
Figure 15:
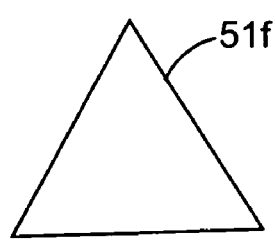
FIG. 15 is a schematic view of an alternative aperture 51f that is provided as a triangle.
Figure 16:
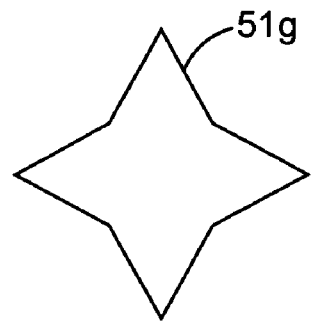
FIG. 16 is a schematic view of an alternative aperture 51g that is provided as a four-pointed star.

FIG. 9 illustrates one of the circular apertures 51 used in the preferred truck bed rail 30 of FIGS. 1B and 2-8. As shown in FIGS. 10-16, however, the bed rail according to the present invention may be provided with apertures in any desired shape such as ovals 51*a*, squares 51*b*, rectangles 51*c*, hexagons, 51*d*, five-pointed stars, 51*e*, triangles 51*f*, and four-pointed stars 51*g*, to name but a few. It is also possible, of course, to replace the light transmitting apertures with light transmitting material that is translucent or opaque.

As can be appreciated, it is possible to use only one curved end member 60 or 70 rather than both. It is also possible, of course, to provide an access port in a curved end member of an otherwise integral bed rail, so that a straight, rigid light assembly 80 may be slid through the access port and into the bed rail. Lastly, it is also possible to use a somewhat flexible segmented arrangement of smaller light sources that may be pulled into and then secured within an integral or multi-piece bed rail.

The above description is directed to the presently preferred embodiments of the subject invention. It should be understood that various modification are possible without departing from the spirit and scope of the herein claimed invention. The preferred embodiments, therefore, should not be used to limit the scope of the invention that is set forth in the following claims.

I claim:

1. A lighted truck bed rail for use with a truck comprising:
   a tubular member having a wall and first and second ends;
   means for fastening the first and second ends of the tubular member to the bed of a truck;
   a light source mounted inside the tubular member, the light source emanating light rays therefrom;
   a plurality of light transmitting apertures located in the wall of the tubular member, the light rays from the light source passing through the light transmitting apertures.

2. The lighted truck bed rail of claim 1 wherein the tubular member comprises:
   a central member;
   at least one curved end member; and
   means for attaching the central member to the curved end member.

3. The lighted truck bed rail of claim 2 wherein the at least one curved end member comprises first and second curved end members.

4. The lighted truck bed rail of claim 1 wherein the light source is a rigid light source.

5. The lighted truck bed rail of claim 4 wherein the rigid light source is a neon bulb assembly.

6. The lighted truck bed rail of claim 1 wherein the light transmitting apertures are empty.

7. The lighted truck bed rail of claim 1 wherein the light transmitting apertures are filled with a translucent or transparent material.

8. The lighted truck bed rail of claim 1 wherein the light transmitting apertures are located on an outward facing side of the wall of the tubular member.

9. The lighted truck bed rail of claim 1 wherein the light transmitting apertures have a shape defined by one of a circle, an oval, a square, a rectangle, a triangle, a hexagon, and a star.

10. A lighted truck bed rail for use with a truck comprising:
    a tubular member formed from a main member having an end port and at least one curved end member;
    means for attaching one end of the at least one curved end member to the end port of the main member;
    means for fastening the tubular member to the bed of a truck;
    a light source mounted inside the main member via the end port, the light source emanating light rays therefrom; and
    a plurality of light transmitting apertures located in the wall of the main member, the light rays from the light source passing through the light transmitting apertures.

11. A lighted truck bed rail for use with a truck, comprising:
    a tubular member formed from a main member having an end port and at least one curved end member;
    means for attaching one end of the at least one curved end member to the end port of the main member;
    means for fastening the tubular member to the bed of a truck;
    a light source mounted inside the main member via the end port, the light source emanating light rays therefrom; and
    a plurality of light transmitting apertures located in the wall of the main member, the light rays from the light source passing through the light transmitting apertures,
    wherein the means for attaching comprises a sleeve connected to one of the main member and the at least one curved end member, the sleeve fitting snugly within another one of the main member and the at least one curved end member.

12. The lighted truck bed rail of claim 10 wherein the light source is a rigid light source.

13. The lighted truck bed rail of claim 12 wherein the rigid light source is a neon bulb assembly.

14. The lighted truck bed rail of claim 10 wherein the light transmitting apertures are empty.

15. The lighted truck bed rail of claim 10 wherein the light transmitting apertures are filled with a translucent or transparent material.

16. The lighted truck bed rail of claim 10 wherein the light transmitting apertures are located on an outward facing side of the wall of the tubular member.

17. The lighted truck bed rail of claim 10 wherein the light transmitting apertures have a shape defined by one of a circle, an oval, a square, a rectangle, a triangle, a hexagon, and a star.

18. A lighted truck bed rail for use with a truck comprising:
    a tubular member formed from a central member that has two end ports and is substantially straight and from first and second curved end members;
    means for attaching one end of each of the first and second curved end members to a corresponding end port of the central member;
    means for fastening another end of the first and second curved end members to the bed of a truck;
    a rigid light source mounted inside the central member via one of the end ports, the light source emanating light rays therefrom; and
    a plurality of light transmitting apertures located in the wall of the central member, the light rays from the light source passing through the light transmitting apertures.

19. A lighted truck bed rail for use with a truck, comprising:
    a tubular member formed from a central member that has two end ports and is substantially straight and from first and second curved end members;
    means for attaching one end of each of the first and second curved end members to a corresponding end port of the central member;
    means for fastening another end of the first and second curved end members to the bed of a truck;
    a rigid light source mounted inside the central member via one of the end ports, the light source emanating light rays therefrom; and
    a plurality of light transmitting apertures located in the wall of the central member, the light rays from the light source passing through the light transmitting apertures,
    wherein the means for attaching comprises a sleeve connected to at least one of the central member and the first and second end members, the sleeve fitting snugly within another one of the central member and the first and second end members.

20. The lighted truck bed rail of claim 18 wherein the rigid light source is a neon bulb assembly.

21. The lighted truck bed rail of claim 18 wherein the light transmitting apertures are empty.

22. The lighted truck bed rail of claim 18 wherein the light transmitting apertures are filled with a translucent or transparent material.

23. The lighted truck bed rail of claim 18 wherein the light transmitting apertures are located on an outward facing side of the wall of the tubular member.

24. The lighted truck bed rail of claim 18 wherein the light transmitting apertures have a shape defined by one of a circle, an oval, a square, a rectangle, a triangle, a hexagon, and a star.

* * * * *